3,001,863
PROCESS FOR OBTAINING FERROUS METALS
AND ALLOYS FROM THEIR ORES
André Greffe, Annecy, France, assignor to Societe d'Electro-Chimie d'Electro-Metallurgie et des Acieries Electriques d'Ugine, Paris, France, a corporation of France
No Drawing. Filed July 28, 1959, Ser. No. 829,975
Claims priority, application France Aug. 1, 1958
12 Claims. (Cl. 75—11)

The present invention relates to the direct obtention of low carbon ferrous metals and ferroalloys by reduction of their oxides.

Generally, the extraction of metals from the ores containing them as oxides easily reducible by carbon involves a phase of reduction by carbon during which all of these oxides are reduced. Thus, a carburized alloy is obtained which, besides the desired metals, contains also other metals often difficult to remove. For that reason, certain ores are not easily utilizable in industry. Moreover, the metal has a high carbon content and the removal of this carbon is a costly operation, generally discontinuous. Although they are commonly used, these methods present other disadvantages, among which are the large investments required and the high consumption of refractory materials.

The present invention concerns a process for the continuous treatment of an ore in order to selectively extract therefrom, in a substantially uncarburized form, one or several metals present in said ore as oxidized compounds.

The process of the invention consists in supplying an electric furnace, provided with carbon electrodes and wherein the walls and bottom are not of carbonaceous material, with a mixture containing: the matter to be reduced, a solid reducing agent in an amount insufficient to reduce all of the oxides and, if required, one or several fluxes, in continuously supplying the furnace with said mixture, in forming on the furnace bottom a layer of molten metal covered with a layer of oxidized molten slag, in producing the heat necessary to melt the charge and reduce it in the upper part of this slag layer, so as to avoid a superheating of the molten metal layer, and in periodically withdrawing a portion only of the molten metal and a portion only of the molten slag from the furnace in such manner as to continuously maintain a double layer of molten metal and molten slag in the furnace.

The matter to be reduced may be a raw ore, an ore concentrated by physical means, or an ore already partly reduced.

Therefore, the process of the present invention comprises a fusion reduction of the matter to be reduced realized continuously in one reaction apparatus in such a way that, due to a partial reduction of the metallic oxidized compounds contained in said matter, a metal or an alloy substantially free from carbon is obtained. By an operation realized continuously is meant an operation which, owing to the periodic charging of the furnace and the periodic withdrawal of a part only of the metal and a part only of the molten slag, may be carried on for weeks and even for months without completely draining or stopping the furnace.

A characteristic of the process consists in maintaining a layer of molten metal on the furnace bottom. Said layer is kept liquid at a temperature slightly above its melting point due to the heat transmitted by contact with the layer of molten slag covering it and to the heat of the metal which once formed from the ore flows down through said slag layer. As we can see, this layer of molten metal is not heated directly. It has no contact with the electrodes and it is not carburized as it would be by such a contact. Its temperature is regulated, as explained hereafter, so that it will not be superheated; in consequence, it does not attack the refractory material of the walls in contact with it and dissolves no oxide from the layer of molten slag. The obtained metal is periodically extracted from the furnace as it will be explained more completely later.

A further characteristic of the process consists in maintaining a layer of oxidized molten slag above the layer of molten metal. The parts played by this slag layer are important and form characteristics of the process.

Said slag layer is the medium wherein the heat is produced. Said heat production occurs either only by resistance effect when the electrodes are slightly immersed in the slag layer or partly by arc effect and partly by resistance effect when the electrodes are placed slightly above the surface of the molten slag layer. The electrodes may be fed by a source of monophase or triphase current.

This slag layer prevents the molten metal it covers from being unsuitably superheated. For that purpose, the heat is produced in or slightly above its upper part, as hereabove indicated, and the thickness of said layer is determined in order that the temperature of its lower part, less high than that of its upper part, be low enough to avoid all sensible reaction between its components and the metal, or all noticeable dissolving of its components by the metal. This thickness of the molten slag layer will be all the greater as the thermal conductance and the melting temperature of said slag are higher. The hereafter given examples give precise indications for the ores with which they are concerned and may be used as a guide for applying the process to other ores.

Owing to its oxidizing nature, the layer of molten slag completes the oxidation of the reducing agent introduced into its surface and of the carbon from wear of the electrodes and, thereby prevents them from reaching or contaminating the layer of molten metal.

The layer of molten slag is the medium wherein the desired reduction of oxides occurs; however, most of this reduction occurs in the upper part of said layer, thereby preventing the whole molten slag layer from being stirred up by a considerable gaseous emission.

A further characteristic of the process is the presence of a temperature gradient between the upper and lower part of the molten slag layer. The obtention of a relatively low temperature in said lower part is essential to ensure the continuous running of the furnace, to prevent its walls from being attacked when the furnace is discharged and to prevent the metal from being carburized. As hereabove indicated, such a low temperature is obtained by determining the deepness of the layer from the thermal conductivity of the slag and by avoiding a violent stirring therein.

A further characteristic of the process is that the degree of reduction of the charge is regulated by keeping a minimum amount of oxides in said slag layer due to feeding suitable relative proportions of ore and reducing agent. In the slag, besides the oxides not to be reduced, oxide among those to be reduced. For instance, in the is maintained a certain amount of the least reducible case of an ore containing another oxide more reducible than iron oxide and wherefrom the metal is to be obtained as a most concentrated alloy, the maximum amount of iron oxide is left in the residual slag by reducing only the amount necessary for the obtention of a satisfactory output in alloyed metal. The residual amount of the least reducible oxide must be sufficient to allow the portions of metal which are carburized in the upper part of the slag layer to be freed from carbon during their descent through said layer.

As hereabove mentioned, the amount of oxides to be maintained in the molten slag layer determines the relative proportions of reducing agent and ore to be used. Said amount of oxides being determined, the operator can easily calculate these relative proportions according to the amounts of gangue in the ore, or flux, if required, to render this gangue fusible, and of impurities in the material used as reducing agent. It is also possible to introduce an oxide not contained in the ore into the furnace together with the ore and the reducing agent, for instance, if a minimum amount of said oxide is to be maintained in the layer of molten slag.

At last, the deepness of both metal and slag layers acting as a capacity and the metal formed in the upper part of the slag layer becoming purified by flowing through said layer make easier the obtention of an alloy having a relatively constant composition. Besides, it is possible, by modifying the composition of the charge during the operation, to regulate the amount of oxides in the slag layer and to maintain it within the limits suitable for the obtention of the desired metal.

The constituents of the charge: matter to be reduced, reducing agent, oxide, and flux, if required, are introduced into the reaction apparatus during the operation at the surface of the molten slag layer, preferably in the solid state. Then they form a thermal screen on this surface which reduces the losses of energy by radiation. They may be introduced after a previous mixing or separately. In the latter case, the rate and the volume of these chargings must be determined so that the composition of the molten slag layer be maintained within the desired limits of composition.

Metal and slag are periodically drained off, while in each case the desired limits of deepness of both molten layers are maintained. The draining or withdrawal frequency may be different for metal and slag if the volumes of metal and slag formed are different.

To carry out the process of the invention, a monophase or triphase electric furnace is preferably used, formed of a vertical container with a non-conducting bottom and provided with a device permitting tapping from two different levels above the bottom, this type of furnace being unusual in the ferroalloys industry. The height of the lower tapping level corresponds to the minimum height where the metal or alloy layer is to be maintained; the vertical distance between the two tapping levels corresponds to the minimum height of the slag layer. The tapping devices may be of any known type, for instance, the usual type of tap holes, syphons, etc. When some metal is to be tapped out in order to maintain the depth of the metal layer below the desired maximum value, the device corresponding to the lower tapping level is used; for instance, the lower tap hole is opened until some slag appears in the flowing metal stream. When some slag is to be tapped out in order to maintain the depth of the slag layer below the desired maximum value, the device corresponding to the upper tapping level is used; for instance, the upper tap hole is opened. The depth of both metal and slag layers is maintained at or above the desired minima values due to the position of the tapping levels. Therefore, such a furnace allows both molten layers to be maintained at the desired depths without any difficulty.

If it is desired to introduced a previously partially reduced ore into the reduction fusion furnace, the previous partial reduction may be carried on up to the point where there remains in the partially reduced ore the necessary amount of the least reducible oxide among those to be reduced in the reduction fusion furnace. Thus, as an example, as hereabove indicated, to obtain a steel containing no chromium from an ore containing oxides of chromium, iron and nickel, it is possible to carry on said previous partial reduction up to the point where the partially reduced ore still contains not only the oxidized compound of chromium but also a certain amount of iron oxide.

Said partial reduction is preferably carried out with the ore in the solid state and may be carried out by any known means or processes, for instance, in a rotating furnace or in a fluidized bed, with any agent capable of causing the desired reducing action on the ore submitted to the process.

The amount of solid carbonaceous reducing agent introduced into the reduction fusion electric furnace depends upon the degree of reduction of the partly reduced ore introduced into said furnace. This amount may be very small. It may even be zero if the previous partial reduction has been carried on up to the point where the product of the previous partial-reduction treated ore contains only the necessary amount of oxides for carrying out the subsequent reduction fusion operation. The reducing agent may be introduced either totally into the partial pre-reduction furnace or partly into said furnace and partly into the reduction fusion furnace.

The product from the partial pre-reduction operation is, preferably, directly introduced, without any intermediate cooling down, from the enclosure where the partial pre-reduction has been carried out, into the furnace where the treatment of the ore is completed by the reduction fusion operation.

The partial pre-reduction step allows a part of the energy necessary for treating the ore to be provided in the form of a solid, liquid or gaseous fuel, which is often more economical than electric energy. In the case of the treatment of a very high grade ore, it is also possible to limit the emission in the reduction fusion furnace to a value low enough to avoid a violent stirring of the slag layer in the furnace.

The present invention permits the selective extraction of one or several metals from an ore containing their oxides. Compared to the processes commonly used, it presents important economical advantages. In particular, the investment necessary to carry it out is reduced; it substantially decreases the consumption of refractory materials and oxidizing agents generally used for the further decarburizing of pig iron. It may be applied to ores which vary widely in composition and allows the obtention, with certain complex ores, of various results depending upon the nature and the amount of oxides maintained in the molten slag layer.

The examples given hereafter show particular cases in the application of the process of the present invention.

*Example I*

This example relates to the production of a low carbon steel from an ore rich in iron and containing:

|  | Percent |
|---|---|
| $Fe_2O_3$ | 65.42 |
| $SiO_2$ | 2.40 |
| $Al_2O_3$ | 8.48 |
| $CaO$ | 8.60 |
| $MgO$ | 2.24 |
| $S$ | 0.065 |
| $P$ | 0.025 |
| Fire loss | 12.64 |

A series monophase electric furnace was used, having a refractory non-carbonaceous bottom and provided with two tap holes, one for the molten metal, the other for the molten slag, with their axes respectively located at 20 cm. and 45 cm. above the bottom.

Into this furnace was introduced a mixture containing, by weight:

| | Parts |
|---|---|
| Ore (grain size, <30 mm.) | 100 |
| Coke fines (grain size, <3 mm.) | 18 |
| Lime | 5 |

Once a layer of molten metal and a layer of molten slag formed, said layers increased in thickness as the supernatant ore-reducing agent mixture reacted and fused. Periodically, when the metal layer reached a level a few centimeters above the lower tap hole, a portion of said layer was drained off through this tap hole. Likewise, the slag was periodically drained off through the upper tap hole when the slag layer reached a level a few centimeters above the optimum height of 25 cm. The withdrawn metal was a low carbon steel, highly dephosphorized, containing:

| | Percent |
|---|---|
| C | 0.06 |
| Si | 0.02 |
| S | 0.075 |
| P | 0.05 |

The withdrawn slag contained:

| | Percent |
|---|---|
| $SiO_2$ | 10.40 |
| FeO | 10.10 |
| $Al_2O_3$ | 28.50 |
| CaO | 43.35 |
| MgO | 7.65 |

The weight of the tapped slag was about 310 kgs. per metric ton of treated ore. The yield of iron was 92%.

Example II

This example relates to the production of ferronickel containing very little carbon with the object of extracting most of the nickel contained in the ore. The employed ore contained:

| | Percent |
|---|---|
| NiO | 3.67 |
| CoO | 0.15 |
| $SiO_2$ | 40.00 |
| $Fe_2O_3$ | 19.00 |
| $Al_2O_3$ | 3.50 |
| MgO | 22.50 |
| $SO_3$ | 0.08 |
| $P_2O_5$ | 0.014 |
| Fire loss | 11.00 |

As in Example I, a monophase furnace with a refractory bottom was used but the tap hole axes were at 20 and at 90 cm. above the bottom. This furnace was supplied with a mixture of ore and coke fines containing, by weight:

| | Parts |
|---|---|
| Ore (grain size, <25 mm.) | 100 |
| Coke fines with 15% ash (grain size, <3 mm.) | 3.5 |

Without any addition of flux, this ore gave a sufficiently fusible slag. The obtained alloy contained:

| | Percent |
|---|---|
| Ni+Co | 39.70 |
| C | 0.06 |
| Si | 0.03 |
| Fe | Balance |

The withdrawn slag contained:

| | Percent |
|---|---|
| $SiO_2$ | 50.50 |
| CaO | 0.19 |
| $Al_2O_3$ | 4.55 |
| MgO | 28.40 |
| FeO | 16.20 |
| NiO | 0.18 |

It will be noted that the nickel extraction was very complete, since the residual slag contained only 0.18% NiO and weighed about 78% of the charged ore. Therefore, the nickel contained in said slag represented about 3.7% of the nickel contained in the ore.

Example III

This example relates to the direct obtention of a low carbon ferrous alloy containing nickel but substantially no chromium, from an ore containing iron, nickel and chromium oxides. Such an ore cannot be used for the production of steel or iron by the usual processes because in carrying them out the chromium oxides are also reduced and a chromium pig iron is obtained from which the chromium is difficult to remove. The utilized ore contained:

| | Percent |
|---|---|
| $Fe_2O_3$ | 74.00 |
| NiO | 0.83 |
| $Cr_2O_3$ | 2.29 |
| $SiO_2$ | 2.60 |
| $Al_2O_3$ | 6.70 |
| CaO | Traces |
| MgO | Traces |
| S | 0.120 |
| P | 0.031 |
| Fire loss | 11.00 |

The utilized furnace was similar to that of Example I with the tap holes located in the same manner. The charge mixture contained:

| | Parts |
|---|---|
| Ore (grain size, <1 mm.) | 100 |
| Coke fines at 15% ash (grain size, <3 mm.) | 24 |
| Flux (lime) | 20 |

The obtained metal contained:

| | Percent |
|---|---|
| Ni | 1.45 |
| Cr | Traces |
| C | 0.05 |
| P | 0.01 |
| Fe | Balance |

The withdrawn slag contained:

| | Percent |
|---|---|
| NiO | Traces |
| FeO | 8.52 |
| $Cr_2O_3$ | 6.23 |
| $SiO_2$ | 12.14 |
| $Al_2O_3$ | 18.20 |
| CaO | 54.50 |
| MgO | 0.41 |

These figures show that practically all of the chromium remained in the slag, that the iron oxide had been partly reduced and that the nickel oxide had been totally reduced. As the slag represented about 40% by weight of the charged ore, the loss in iron in said slag represented only about 5% of the iron contained in the ore and the loss of nickel was negligible.

Example IV

Into a rotatable furnace heated by means of an oil burner was introduced a mixture containing, by weight:

| | Parts |
|---|---|
| Crushed iron ore | 100 |
| Coke fines | 19 |

The ore composition was as follows:

| | Percent |
|---|---|
| Fe (as oxides) | 47.20 |
| $SiO_2$ | 7.50 |
| $Al_2O_3$ | 1.00 |
| CaO | 9.50 |
| MgO | 1.30 |
| Fire loss | About 12.00 |

The operation of the furnace was regulated so as to obtain a temperature between 1000° C. and 1100° C. in the reaction zone. The preheated, partially reduced ore fell directly at a temperature above 800° C. into the electric reduction fusion furnace wherein the treatment was completed. The composition of this partially reduced ore was:

|  | Percent |
|---|---|
| Metallic iron | 43.20 |
| FeO | 24.30 |
| $SiO_2$ | 9.80 |
| $Al_2O_3$ | 1.40 |
| CaO | 12.00 |
| MgO | 1.60 |
| Unconsumed C | 7.70 |

The electric reduction fusion furnace was operated as described in Example I. The metal coming out of this furnace contained:

|  | Percent |
|---|---|
| C | 0.08 |
| Si | 0.10 |
| P | 0.01 |
| Fe | Balance |

The withdrawn slag contained:

|  | Percent |
|---|---|
| $SiO_2$ | 35.00 |
| $Al_2O_3$ | 6.10 |
| FeO | 8.90 |
| CaO+MgO | 50.00 |

The consumption of electric energy in the second furnace was only 1420 kw./h. per metric ton of cast metal. If we compare this amount to the 2500 kw./h. generally considered as the amount necessary for the direct obtention of pig iron in an electric furnace from an iron ore of composition similar to the one used in the present example, we can observe that the process of the invention, although it is a process for direct reduction in an electric furnace, is advantageous not only because it directly gives a very low carbon metal (a mild steel in the case of an iron ore containing no other notable metallic compound) but also because, by reducing the amount of energy to be used as electric energy, it partly replaces it by less costly energy.

The invention is not limited to the preferred embodiments but may be otherwise embodied or practiced within the scope of the following claims.

I claim:

1. A continuous process for obtaining low carbon ferrous metals and alloys from their ores which comprises charging an electric furnace having carbon electrodes but walls and bottom of refractory non-carbonaceous material with a mixture containing the ore and a solid carbonaceous reducing agent in an amount insufficient to reduce all of the oxides of the ore, heating the charge to fuse it and form a layer of molten metal on the bottom of the furnace and a layer of molten thermally conductive slag on top of the layer of metal, periodically adding said mixture containing ore and reducing agent to the layer of molten slag, producing in the upper part of the slag layer the heat necessary for the reduction and fusion of said mixture, said heat being that required for keeping said metal at a temperature slightly above its melting point, and being that which produces a temperature gradient between the upper and lower part of said slag layer with said lower part having a relatively low temperature compared to said upper part and being carried out by maintaining said carbon electrodes slightly below the upper surface of said layer of slag, the depth of the thermally conductive slag layer under the heating conditions being sufficient to maintain a substantial difference in temperature between the upper and lower surface of the slag layer, maintaining a predetermined minimum depth in said layer of slag by periodically withdrawing a part only of said slag and a part only of said molten metal from two tapping levels of said furnace disposed apart vertically a distance corresponding to said predetermined minimum depth of said layer of slag, with said lower tapping member being disposed a distance from said furnace bottom corresponding to a predetermined minimum depth of said layer of molten metal, said minimum depth of said slag layer being maintained at a greater depth for slags of high thermal conductivity and at a lesser depth for slags of low thermal conductivity.

2. The process of claim 1 characterized by adding a flux material to said furnace for assisting in fusing gangue in said ore.

3. The process of claim 1 characterized by making said periodic withdrawals of metal and slag when said layers reach a few centimeters above said tapping levels.

4. The process of claim 1 characterized by said ferrous metals and alloys obtained having a carbon content below .10.

5. The process of claim 1 characterized by said ferrous metals and alloys obtained being a nickel-steel, having a carbon content below .10.

6. The process of claim 1 characterized by said ore containing iron, nickel and chromium and by said ferrous metals and alloys obtained being a nickel-steel with a carbon content being below .10 and with not more than trace amounts of chromium.

7. A continuous process for obtaining low carbon ferrous metals and alloys from their ores which comprises charging an electric furnace having carbon electrodes but walls and bottom of refractory non-carbonaceous material with a mixture containing the ore and a solid carbonaceous reducing agent in an amount insufficient to reduce all of the oxides of the ore, heating the charge to fuse it and form a layer of molten metal on the bottom of the furnace and a layer of molten thermally conductive slag on top of the layer of metal, periodically adding said mixture containing ore and reducing agent to the layer of molten slag, producing in the upper part of the slag layer the heat necessary for the reduction and fusion of said mixture, said heat being that required for keeping said metal at a temperature slightly above its melting point, and being that which produces a temperature gradient between the upper and lower part of said slag layer with said lower part having a relatively low temperature compared to said upper part and being carried out by maintaining said carbon electrodes slightly above the upper surface of said layer of slag, the depth of the thermally conductive slag layer under the heating conditions being sufficient to maintain a substantial difference in temperature between the upper and lower surface of the slag layer, maintaining a predetermined minimum depth in said layer of slag by periodically withdrawing a part only of said slag and a part only of said molten metal from two tapping levels of said furnace disposed apart vertically a distance corresponding to said predetermined minimum depth of said layer of slag, with said lower tapping member being disposed a distance from said furnace bottom corresponding to a predetermined minimum depth of said layer of molten metal, said minimum depth of said slag layer being maintained at a greater depth for slags of high thermal conductivity and at a lesser depth for slags of low thermal conductivity.

8. The process of claim 7 characterized by adding a flux material to said furnace for assisting in fusing gangue in said ore.

9. The process of claim 7 characterized by making said periodic withdrawals of metal and slag when said layers reach a few centimeters above said tapping levels.

10. The process of claim 7 characterized by said ferrous metals and alloys obtained having a carbon content below .10.

11. The process of claim 7 characterized by said ferrous metals and alloys obtained being a nickel-steel, having a carbon content below .10.

12. The process of claim 7 characterized by said ore containing iron, nickel and chromium and by said ferrous metals and alloys obtained being a nickel-steel with a carbon content being below .10 and with not more than trace amounts of chromium.

References Cited in the file of this patent

UNITED STATES PATENTS 2,395,029    Baily _____ Feb. 19, 1946

FOREIGN PATENTS 781,108    Great Britain _____ Aug. 14, 1957